No. 794,609. PATENTED JULY 11, 1905.
R. H. GOLDSBOROUGH.
TURBINE AND MEANS FOR GOVERNING SAME.
APPLICATION FILED APR. 5, 1904.

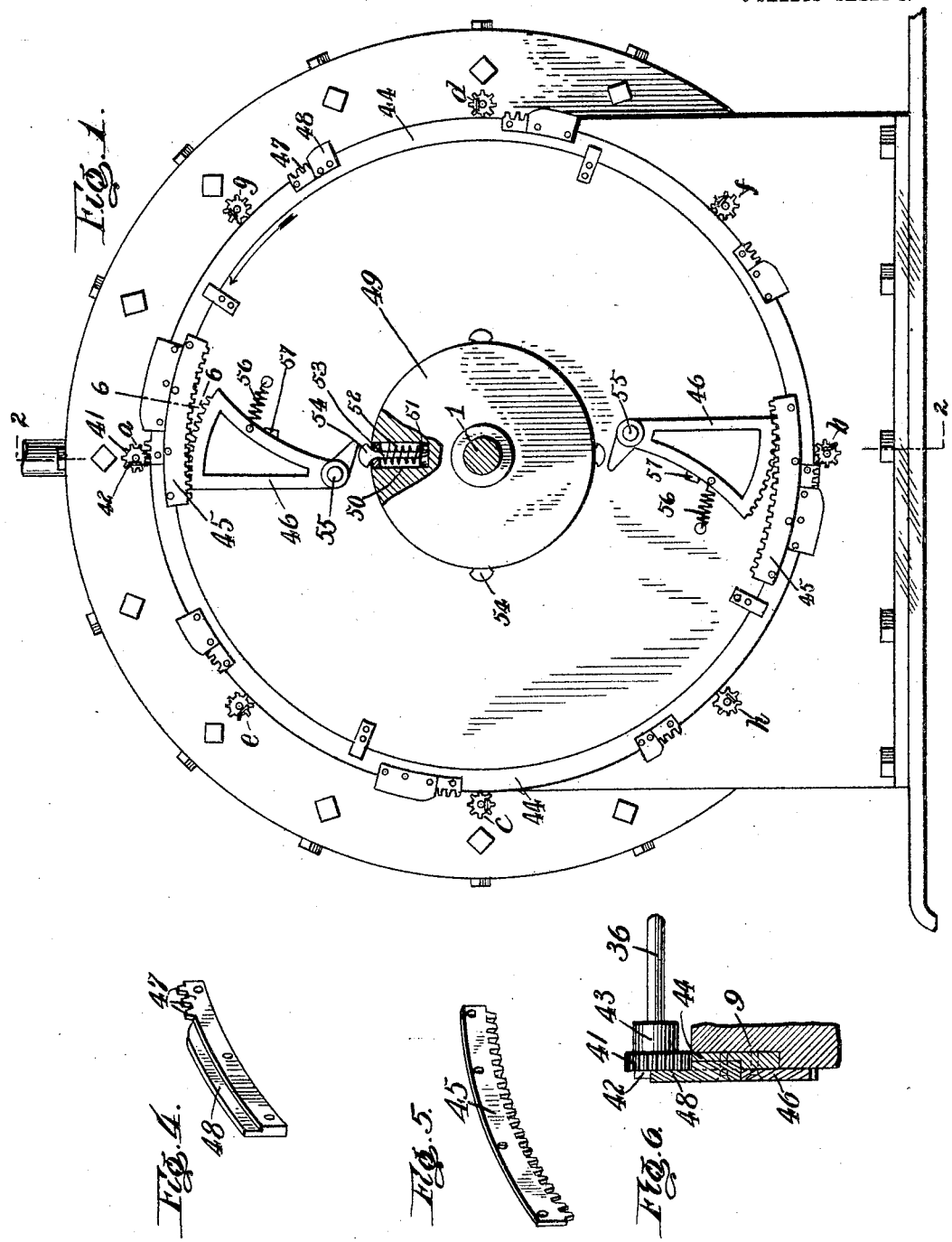

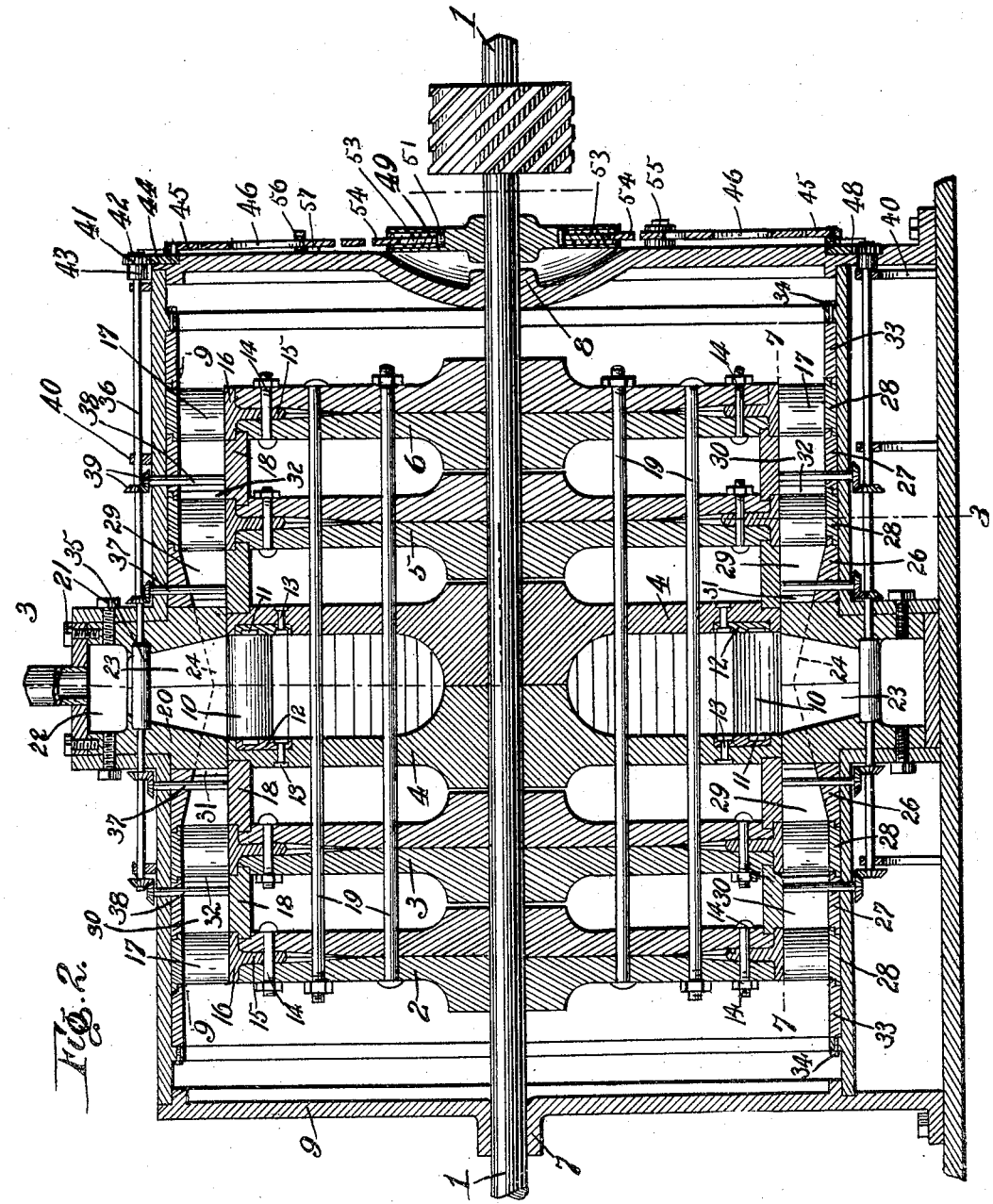

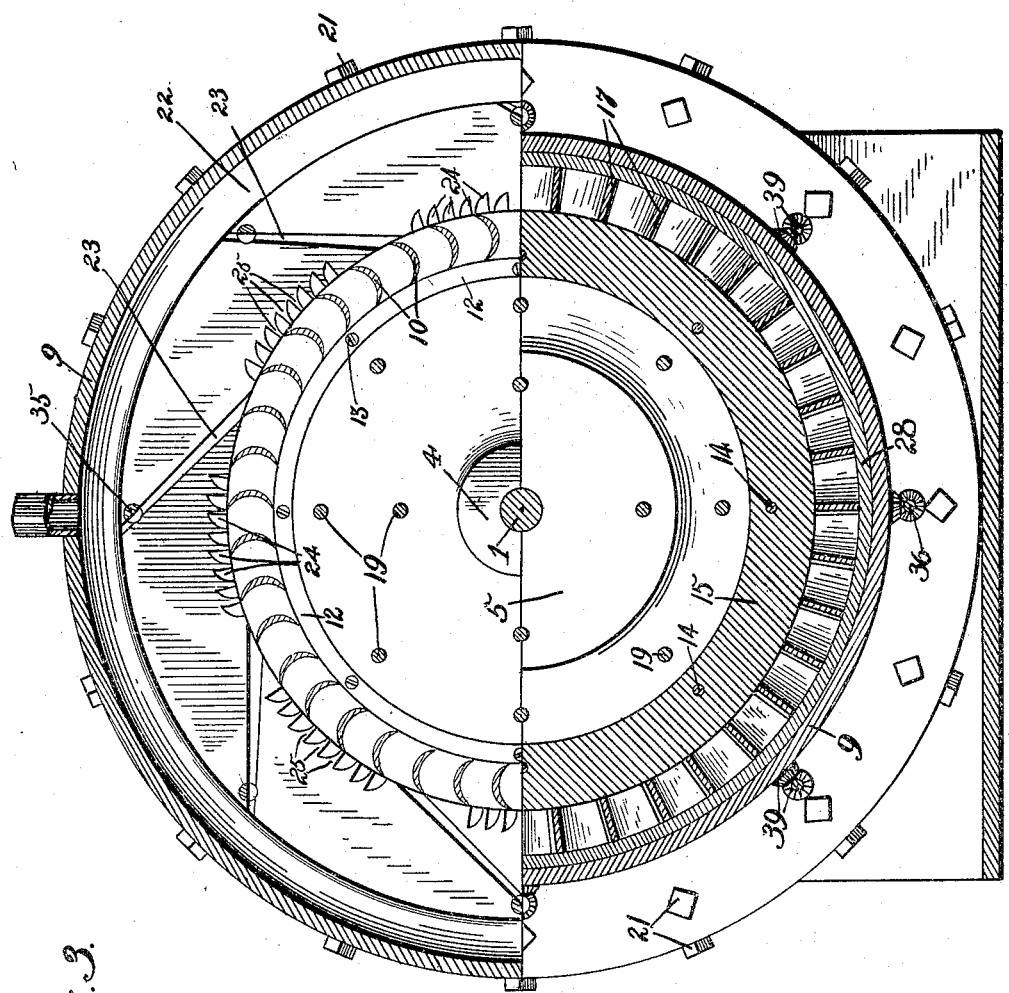

9 SHEETS—SHEET 4.

Witnesses
Eugene M. Hiney
H. A. Robinette

Inventor
Richard H. Goldsborough.
by G. Ayres,
Attorney

No. 794,609. PATENTED JULY 11, 1905.
R. H. GOLDSBOROUGH.
TURBINE AND MEANS FOR GOVERNING SAME.
APPLICATION FILED APR. 5, 1904.

9 SHEETS—SHEET 5.

Witnesses
Eugene M. Hiney
H. A. Robinette

Inventor
Richard H. Goldsborough,
by
G. Ayres.
Attorney

No. 794,609. PATENTED JULY 11, 1905.
R. H. GOLDSBOROUGH.
TURBINE AND MEANS FOR GOVERNING SAME.
APPLICATION FILED APR. 5, 1904.
9 SHEETS—SHEET 6.
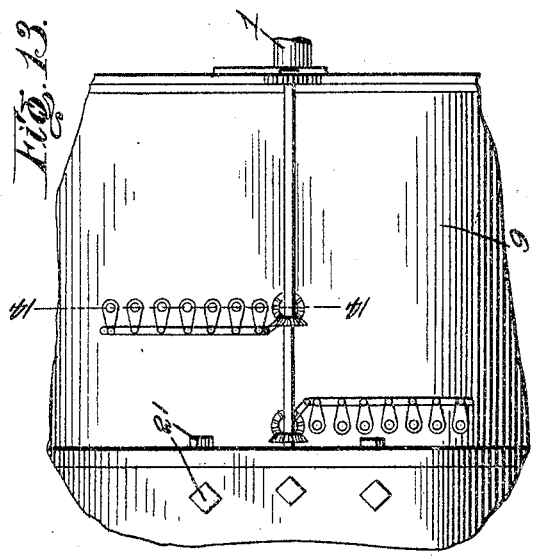
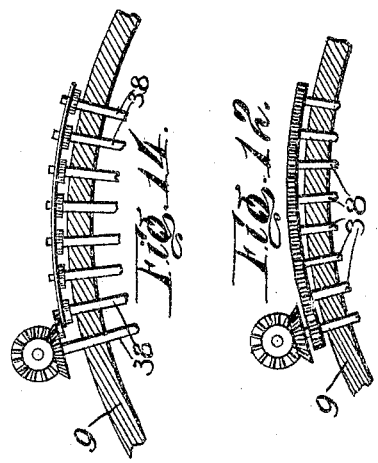
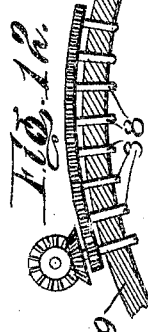
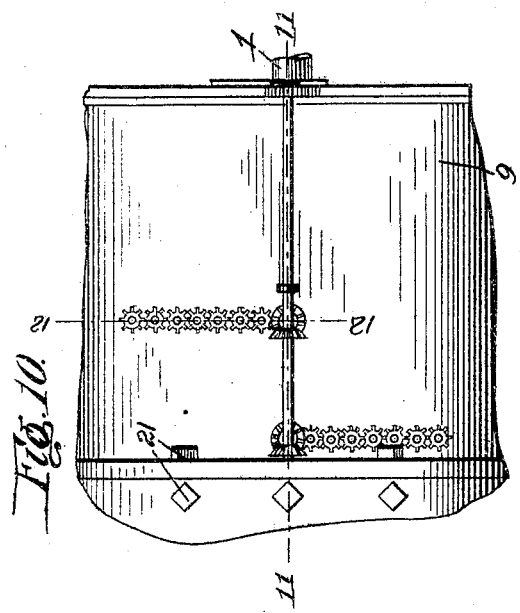
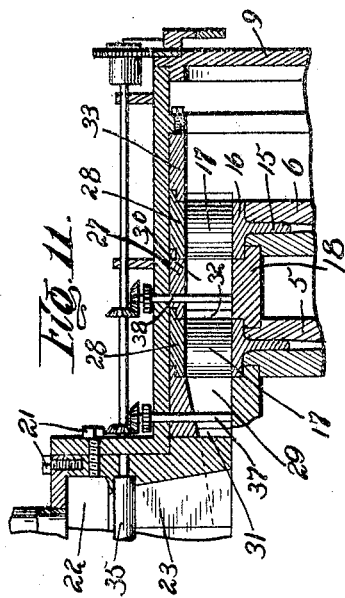
Witnesses
Eugene M Sliney
I. A. Robinette
Inventor
Richard H. Goldsborough.
by G. Ayres,
Attorney.

No. 794,609. PATENTED JULY 11, 1905.
R. H. GOLDSBOROUGH.
TURBINE AND MEANS FOR GOVERNING SAME.
APPLICATION FILED APR. 5, 1904.

9 SHEETS—SHEET 7.

Fig. 15.

Witnesses
Eugene M. Hiney.
H. A. Robinette

Inventor
Richard H. Goldsborough.
by G. Ayres,
Attorney.

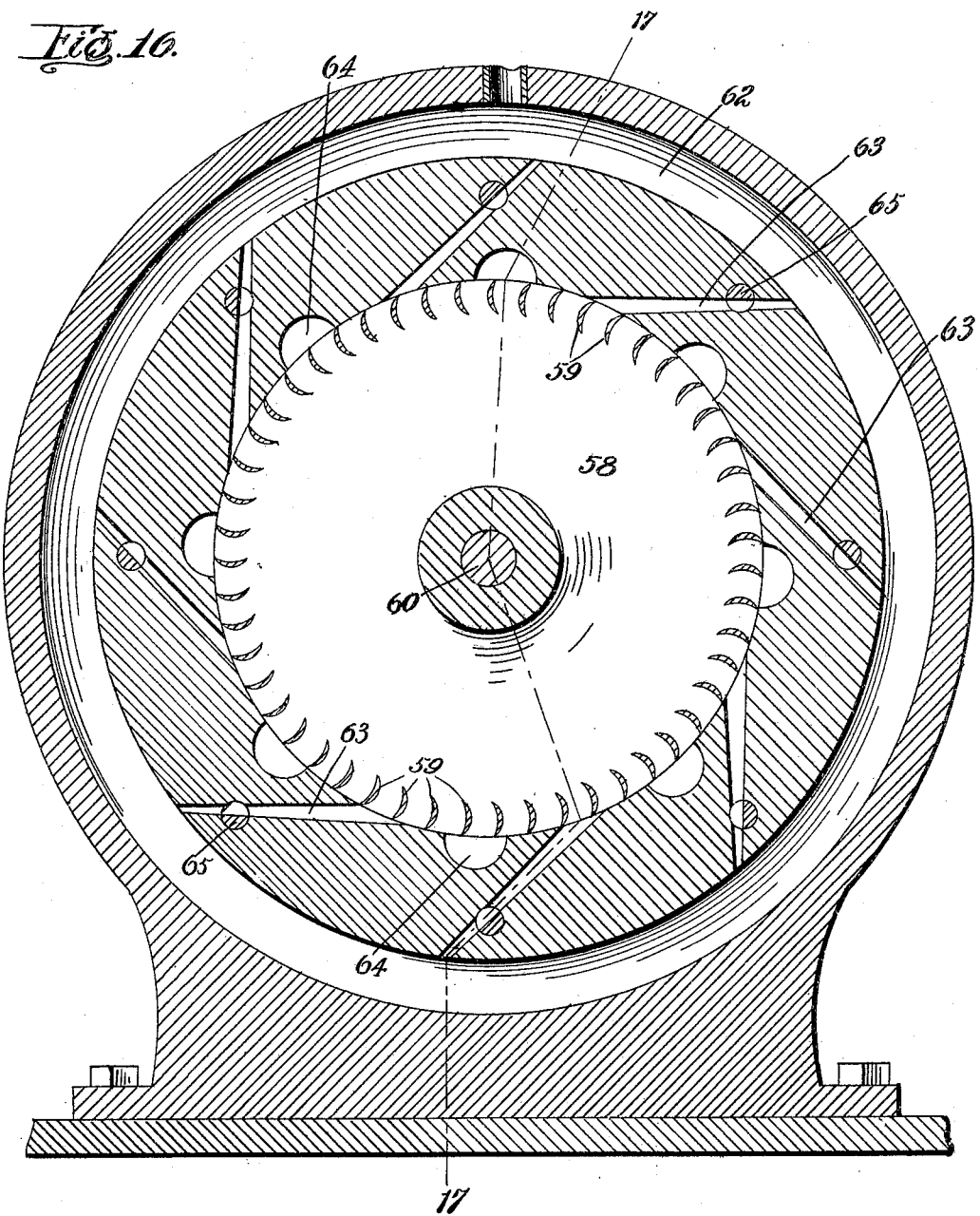

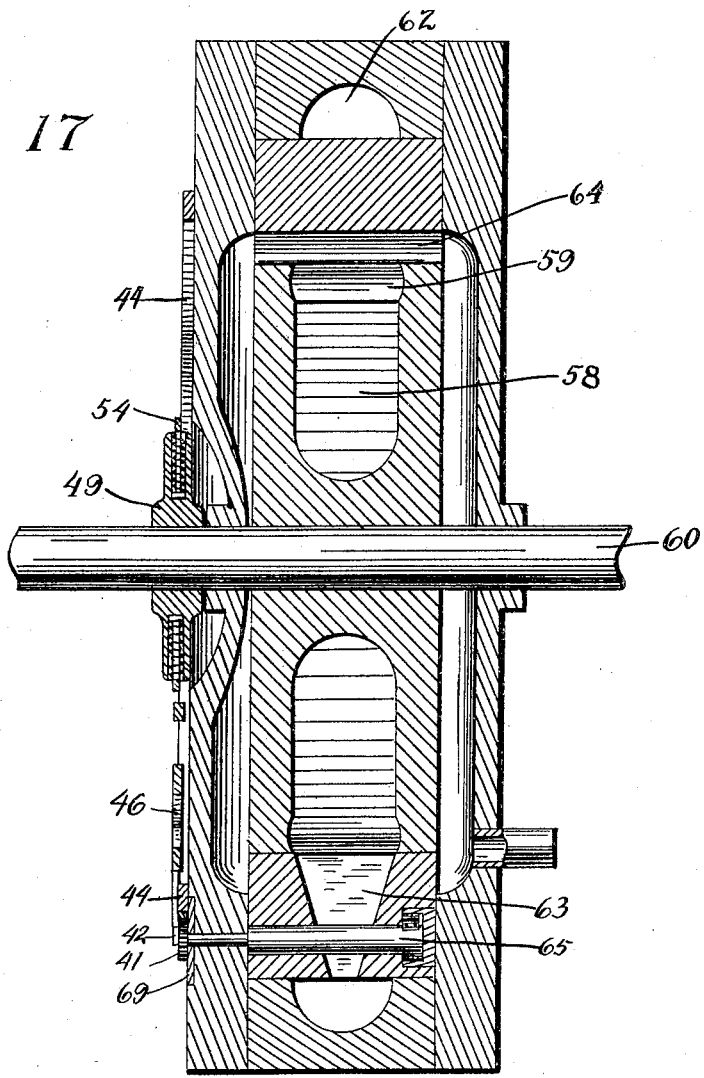

No. 794,609.

Patented July 11, 1905.

UNITED STATES PATENT OFFICE.

RICHARD H. GOLDSBOROUGH, OF WASHINGTON, DISTRICT OF COLUMBIA.

TURBINE AND MEANS FOR GOVERNING SAME.

SPECIFICATION forming part of Letters Patent No. 794,609, dated July 11, 1905.

Application filed April 5, 1904. Serial No. 201,712.

*To all whom it may concern:*

Be it known that I, RICHARD H. GOLDSBOROUGH, a citizen of the United States, residing at Washington, in the District of Columbia, have invented certain new and useful Improvements in Turbines and Means for Governing the Same, of which the following is a specification.

My invention relates to an improvement in turbines and means for governing the same; and it consists in the constructions, combinations, and arrangements herein described and claimed.

The objects of my invention are to provide an improved construction free from bearings between the working parts and consequent leakage from wear, which will be perfectly balanced and operated with a minimum friction loss.

A further object of my invention is to provide a simple mechanical means which will be certain and positive in action for successively controlling predetermined fractional portions of the actuating-medium supply, thereby obtaining an efficient action of the actuating medium at a constant speed of the turbine under all practical conditions of running, such as greatly-varying loads, &c.

Figure 7:
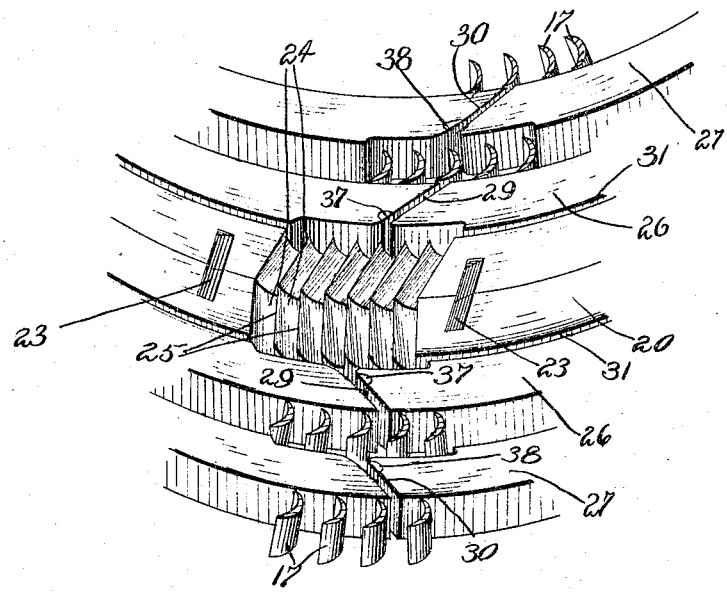
Figure 8:
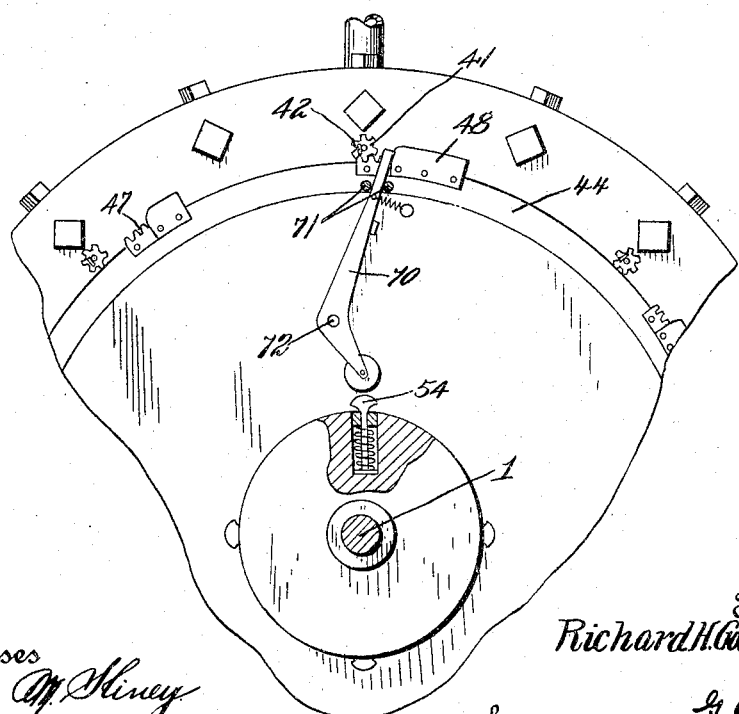
Figure 9:
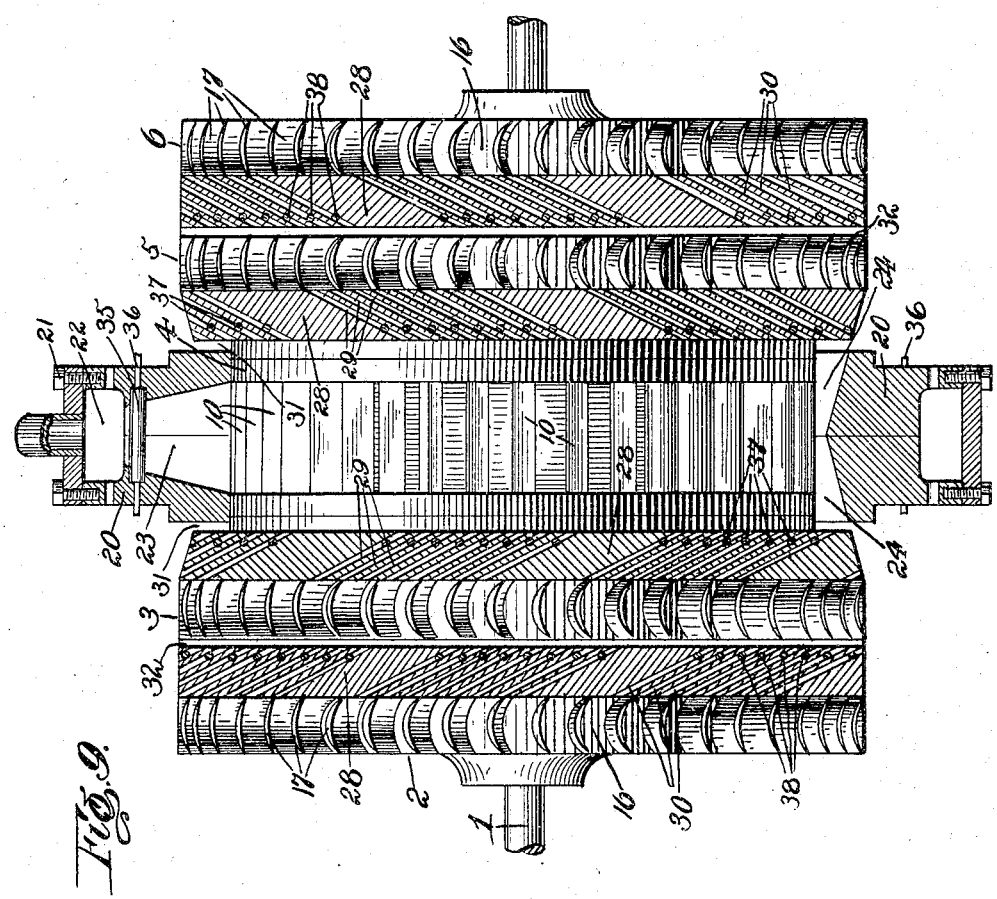

Referring to the accompanying drawings, forming a part of this application, and in which similar reference-symbols indicate corresponding parts in the several views, Figure 1 is an end elevation illustrating one embodiment of my invention. Fig. 2 is a sectional view on the line 2 2 of Fig. 1. Fig. 3 is a sectional view on the line 3 3 of Fig. 2. Fig. 4 is a detailed perspective view illustrating one of the rack and lock bars for actuating the turbine-valves. Fig. 5 is a detailed perspective view of one of the racks carried by a common governor-actuated ring. Fig. 6 is a sectional view on the line 6 6 of Fig. 1. Fig. 7 is a detailed perspective view taken on the line 7 7 of Fig. 2, showing the relative arrangement of the stationary abutments, lateral ports, and De Laval vanes. Fig. 8 is a detailed end elevation illustrating a modified means for actuating the common governor-ring. Fig. 9 is a plan view taken on the line 9 9 of Fig. 2, showing a modified construction in which a series of groups of lateral ports are employed, the central ring of the turbine-casing being shown in sections for clearness. Fig. 10 is a detailed plan view illustrating one means for actuating the valves of two of the groups of ports shown in Fig. 9. Fig. 11 is a detailed sectional view on the line 11 11 of Fig. 10. Fig. 12 is a detailed sectional view on the line 12 12 of Fig. 10. Fig. 13 is a detailed plan view similar to Fig. 10, illustrating a modified construction. Fig. 14 is a sectional view on the line 14 14 of Fig. 13. Fig. 15 is an end elevation illustrating my invention applied to a modified form of turbine. Fig. 16 is a sectional view on the line 16 16 of Fig. 17, and Fig. 17 is a sectional view on the line 17 17 of Fig. 16.

Referring especially to Figs. 1 to 7 of the drawings, which illustrate a three-stage compound turbine, 1 indicates the turbine-shaft, carrying the turbine-wheels 2, 3, 4, 5, and 6 and suitably journaled at 7 and 8 in the turbine-casing 9. The central turbine-wheel 4 carries an annular series of curved vanes 10, which are provided with end projections 11, closely fitting recesses in two flat rings 12 12. The rings 12 are constructed to fit annular recesses formed in the inner walls of the hollow wheel 4, in which they are held by bolts 13 or other suitable securing means, as clearly shown in Figs. 2 and 3. Each of the wheels 2, 3, 5, and 6 is shown comprising two disk-shaped parts provided with bolts 14, clamping therebetween the annular web 15 of an annular base 16, carrying a series of curved vanes 17. The vanes 17 may be secured to their base 16 by casting the latter about their inner ends or such vanes may be machined or otherwise formed on or secured to their base. Annular spacing members 18 are positioned between the several turbine-wheels and clamped in position by a plurality of bolts 19, which hold the several turbine-wheels and spacing members rigidly together in order that they may constitute a single rotating part. A central annular member 20, shown rigidly secured to the turbine-casing by bolts 21, is provided with an annular steam-chamber 22 and with a plurality of ports 23, constructed to direct the steam from the chamber 22 at an efficient angle against the annular series of vanes 10. The inner periphery of the annular member 20 is provided with a series of exhaust-ports 24 at points intermediate of the admission-ports 23. As shown especially in Figs. 2, 3, and 7, the exhaust-ports are preferably formed to cause a practical reversal of the steam entering them and to direct it forwardly in the direction of rotation of the turbine-wheel. The exhaust-ports are also shown, (see especially Figs. 2 and 7,) deepening laterally in both directions from the center of the annular member 20 to provide for expansion of the steam flowing therethrough and with the abutments 25, which constitute partitions between the several exhaust-ports of each series, tapered to a knife-edge adjacent the annular series of vanes 10. The annular member 20 is shown constructed of two similar halves for convenience in forming the ports therein; but obviously this annular member could be formed in one integral piece and the forms of the ports varied as desired. Secured within the turbine-casing 9 are a plurality of rings 26, 27, and 28, the rings 28 being constructed to closely approximate the outer peripheries of the annular series of vanes 17, carried by the turbine-wheels 2, 3, 5, and 6. The rings 26 and 27 are sufficiently thick to bring their inner peripheries adjacent the outer peripheries of the corresponding spacing members 18 and are provided with steam-ports 29 and 30, respectively. (See especially Figs. 2 and 7.) The rings 26 are constructed to leave an annular chamber 31 between the discharge ends of the exhaust-ports 24 and the entrance ends of the ports 29. These annular chambers 31 receive the exhaust from the several groups of the exhaust-ports 24, and thereby act to equalize the pressure at the entrance-orifices of the several ports 29. Similar annular chambers 32, separating the entrance ends of the ports 30 from the adjacent vanes 17, receive the steam deflected from said vanes, and those tend to equalize the pressure of the entrance-orifices of the several ports 30. A preferred construction is one in which the annular chambers 31 and 32 are widened in proximity to the entrance ends of the ports 29 and 30, as more clearly shown in Fig. 7, but such widening is not essential, and the entire annular chambers could be dispensed with, if desired. Adjusting-rings 33 are shown in contact with the two end rings 28 and engaged by screws 34 for accurately adjusting the rings in position. A valve 35, carried by a rod 36, is shown adjacent the entrance-orifices of each steam-admission port 23, and similar regulating-valves 37 and 38 are positioned to control the entrance-orifices of the lateral ports 29 and 30, respectively. The valves 37 and 38 are operatively connected to the rods 36, as by bevel-gears 39, for actuating said valves by said rod. Each rod 36 is journaled in suitable bearings 40 on the turbine-casing and carries at its outer end a spur-gear 41, provided on its face with a locking-lug 42. Suitable means are employed for returning the rod 36 to its initial position and maintaining it there when free from engagement with its actuating-rack. I have shown for this purpose a coiled spring 43, having its respective ends secured to the rod 36 and to one of its bearings 40; but any other equivalent means could be employed. A ring 44, shown rotatably supported on the turbine-casing, has secured thereto two rack-plates 45 in position to be engaged by two toothed bell-crank levers 46. A series of plates provided with rack-teeth 47 and locking-flanges 48 are secured to the common ring 44 in position to successively actuate and lock the gears 41 of the rods 36. For example, in the embodiment of my invention illustrated especially in Fig. 1 the valves operated by that rod 36 which is indicated by the letter $a$ will be closed upon a slight movement of the ring 44 in the direction of the arrow, and the valves operated by those rods indicated by the letters $b$, $c$, $d$, $e$, $f$, $g$, and $h$ will be actuated in the successive order enumerated upon further continued movement of the ring 44. In the construction shown the rods 36 are designed to be turned through ninety degrees by their actuating-racks, after which movement the locking-flanges 48 engage the lugs 42 and lock said rods in their actuated position until the movement of the ring 44 is reversed sufficiently to disengage said locking-flanges from the lugs. The disk 49, secured to the turbine-shaft, is provided with a plurality of recesses 50 for receiving blocks or pistons 51 and guiding the same during their movement under centrifugal force against the tension of springs 52, arranged to bear upon top faces of said pistons. Each piston carries a stem 53, which is provided with a contact-head 54, arranged to engage the inner short arms of the bell-crank levers 46 when said stems are projected from the disk by the action of centrifugal force and to thereby swing said bell-crank levers about their pivotal points 55 and shift the ring 44. Springs 56 are preferably provided for normally maintaining the bell-crank levers against suitable stops 57.

The form of governing device above described is very efficient and satisfactory at the high rotative speeds employed in turbines; but obviously other types of governing devices could be employed, if desired.

In the operation of my invention steam or other actuating medium is maintained at any desired pressure in the annular chamber 22, from which it is directed by the ports 23 at an efficient angle against the periphery of the annular series of vanes 10. The vanes 10 are preferably directed to produce a practical reversal of the steam impinging thereon and to deflect the steam into the interior of the central hollow wheel 4. The steam deflected into the interior of the wheel recurves and passes outward through the vanes at an efficient angle in seeking the path of least resistance to the exhaust-ports 24, thus producing a second useful impact against said vanes 10. The steam thus passing outward through the vanes 10 is deflected by the stationary abutments 25, thereby producing a reaction which exerts an additional turning force on the turbine-wheel. The steam is deflected laterally in both directions by the exhaust-ports 24 and discharged into the annular chambers 31, from which it flows through the ports 29 and is directed at an efficient angle against the adjacent annular series of vanes 17. The vanes 17 are preferably constructed to produce a practical reversal of the steam impinging thereon and to deflect the same into the second annular chambers 32, from which it flows through the ports 30 and is directed at an efficient angle against the adjacent annular series of vanes 17. The steam is deflected from the last annular series of vanes 17 into the turbine-casing, from which it may be led to a condenser or to the atmosphere, or the casing may be provided with the usual condensing sprays or coils to itself constitute a condenser. Should any conditions under which the turbine is operating, such as a decrease in the load, cause its speed to increase above that for which the governing devices are adjusted, the contact-heads 54 will be thrown out into engagement with the bell-crank levers 46 and shift the ring 44 sufficiently to successfully actuate the necessary number of valves for so regulating the steam-supply that the desired speed will be maintained under the conditions of operation.

Referring to Figs. 15, 16, and 17, which illustrate a simple single-stage turbine, 58 indicates a hollow turbine-wheel provided with an annular series of vanes 59 and secured to a shaft 60, suitably journaled in the turbine-casing 61. The turbine-casing is provided with an annular steam-chamber 62, from which the steam is directed by a plurality of ports 63 at an efficient angle against the annular series of vanes 59. A plurality of exhaust-ports 64 are arranged in the casing about the periphery of the annular series of vanes 59 at points intermediate of the discharge ends of the ports 63. The exhaust-ports 64 are shown discharging into the turbine-casing, from which the exhaust actuating medium may be discharged into the atmosphere or into a condenser. If desired, the casing may be provided with the usual condensing sprays or coils to itself constitute a condenser. Each of the admission-ports 63 is provided adjacent its entrance end with an automatically-controlled valve 65 for regulating the entrance-orifice thereof. I have illustrated the controlling-valves as comprising semicylindrical blocks provided at one end with a reduced portion 66, extending through the turbine-casing, and having the opposite end secured to a spring 67, carried by a cap 68, which latter may be screwed or otherwise secured in the turbine-casing. The spring 67 tends to maintain the valve 65 in its normally open position and furnish an exceedingly sensitive and lightly-operated means to be actuated by the governing devices. A disk 69 is secured to the outer end of the reduced portion 66 of each valve and is preferably arranged to rotatably fit within a cylindrical depression formed in the outer wall of the turbine-casing, as clearly shown in Fig. 16. At the outer end of each reduced portion 66 is secured a spur-gear 41 and locking-lug 42, similar to those shown in Fig. 1, in position to be governor-controlled through the intermediary of the previously-described ring 44 and bell-crank levers 46.

In the modified construction illustrated in Fig. 8 the lever 70, slidably engaging two pins 71 on the ring 44, is pivotally supported at 72 in position to be engaged by the governing devices 54 for actuating said ring. This provides a simple alternative construction for the toothed bell-crank lever 46 and racks 45 of the construction illustrated in Fig. 1.

Having thus described my invention, what I claim as new, and desire to secure by Letters Patent, is—

1. In a turbine, the combination of a rotor, a plurality of admission-ports, valves for controlling said ports, operating mechanism for said valves, and governing means disconnected from the operating mechanism and constructed to engage and actuate said mechanism, substantially as described.

2. In a turbine, the combination of a rotor, a plurality of admission-ports, valves for controlling said ports, operating mechanism for said valves, governing means disconnected from the operating mechanism and constructed to engage and actuate said mechanism, and means for adjusting said governing means, substantially as described.

3. In a turbine, the combination of a rotor, a plurality of admission-ports, valves for controlling said ports, a common operating mechanism for said valves, and governing means disconnected from the operating mechanism and constructed to engage said mechanism for actuating it, substantially as described.

4. In a turbine, the combination of a rotor, a plurality of independent admission-ports, valves for controlling said ports, operating mechanism for said valves, and governing means disconnected from the operating mechanism and constructed to engage and actuate said mechanism, substantially as described.

5. In a turbine, the combination of a rotor, a plurality of independent admission-ports, valves for controlling said ports, a common operating mechanism for said valves, and governing means disconnected from the operating mechanism and constructed to engage said mechanism for actuating it, substantially as described.

6. In a turbine, the combination of a rotor, a plurality of admission-ports, valves for controlling said ports, operating mechanism for said valves, governing means disconnected from the operating mechanism and constructed to engage said mechanism for actuating it, and means for normally maintaining said valves in open position, substantially as described.

7. In a turbine, the combination of a rotor, a plurality of admission-ports, valves for controlling said ports, operating mechanism for said valves, governing means disconnected from the operating mechanism and constructed to engage said mechanism for actuating it, and means independent of said governing means for normally maintaining said valves in open position, substantially as described.

8. In a turbine, the combination of a rotor, a plurality of admission-ports, valves for controlling said ports, operating mechanism normally maintained out of engagement with said valves, and governing means disconnected from the operating mechanism and constructed to shift said mechanism successively into engagement with said valves for operating the latter, substantially as described.

9. In a turbine, the combination of a rotor, a plurality of admission-ports, valves for controlling said ports, operating mechanism normally maintained out of engagement with said valves, and governing means disconnected from the operating mechanism and constructed to shift said mechanism successively into engagement with said several valves for operating the latter, substantially as described.

10. In a turbine, the combination of a rotor, a plurality of admission-ports, valves for controlling said ports, a common operating mechanism normally maintained out of engagement with said valves, and governing means disconnected from the operating mechanism and constructed to shift said mechanism into engagement with said valves for operating the latter, substantially as described.

11. In a turbine, the combination of a rotor, a plurality of admission-ports, valves for controlling said ports, operating mechanism normally maintained out of engagement with said valves, and governing means disconnected from the operating mechanism and constructed to engage said mechanism and shift it into engagement with said valves for operating the latter, substantially as described.

12. In a turbine, the combination of a rotor, a plurality of admission-ports, valves for controlling said ports, operating mechanism for adjusting said valves and positively locking them in their adjusted positions, and governing means for actuating said operating mechanism, substantially as described.

13. In a turbine, the combination of a rotor, a plurality of admission-ports, valves for controlling said ports, operating mechanism for adjusting said valves and positively locking them in their adjusted positions, and governing means disconnected from the operating mechanism and constructed to engage said mechanism for actuating it, substantially as described.

14. In a turbine, the combination of a rotor, a plurality of admission-ports, valves for controlling said ports, a common operating mechanism for adjusting said valves and positively locking them in their adjusted positions, and governing means for actuating said operating mechanism, substantially as described.

15. In a turbine, the combination of a rotor, a plurality of admission-ports, valves for controlling said ports, operating mechanism for adjusting said valves and positively locking them in their adjusted positions, governing means for actuating said operating mechanism, and means for normally maintaining said valves in open position, substantially as described.

16. In a turbine, the combination of a rotor, a plurality of admission-ports, valves for controlling said ports, operating mechanism for adjusting said valves and positively locking them in their adjusted positions, and a plurality of independent governing means for actuating said operating mechanism, substantially as described.

17. In a turbine, the combination of a rotor, a plurality of admission-ports, valves for controlling said ports, operating mechanism for successively adjusting said valves, and governing means disconnected from the operating mechanism and constructed to engage said mechanism for actuating it, substantially as described.

18. In a turbine, the combination of a rotor, a plurality of admission-ports, valves for controlling said ports, operating mechanism for successively adjusting said valves and positively locking them in their adjusted positions, and governing means for actuating said operating mechanism, substantially as described.

19. In a turbine, the combination of a rotor, a plurality of admission-ports, an independent valve for controlling each of said ports, a gear connected to each of said valves, a common operating means, a series of racks carried by said operating means in position to successively engage said gears in any predetermined order, bell-crank levers engaging said common operating means, and governing means for actuating said bell-crank levers to shift said common operating means, substantially as described.

20. In a turbine, the combination of a rotor, a plurality of admission-ports, an independent valve for controlling each of said ports, a gear and locking-lug connecting each of said valves, a common operating means, a series of racks and locking-flanges carried by said operating means in position to successively connect said gears in any predetermined order and to lock said gears in their connected positions, and governing means for actuating said operating mechanism, substantially as described.

21. In a compound turbine provided with a plurality of annular series of vanes, an independent series of admission-ports for each of said series of vanes, valves for controlling said ports, a common operating mechanism constructed to adjust said valves upon a predetermined portion of its movement and to lock said valves in their adjusted positions upon its further movement, and governing means for actuating said operating mechanism, substantially as described.

22. In a compound turbine provided with a plurality of annular series of vanes, an independent series of admission-ports for each of said series of vanes, an independent valve for controlling each of said ports, a common operating mechanism constructed to successively adjust said valves upon a predetermined movement and to lock said valves in their adjusted positions upon its further movement, and governing means for actuating said common operating mechanism, substantially as described.

23. In a compound turbine provided with a plurality of annular series of vanes, an independent series of admission-ports for each of said series of vanes, an independent valve for controlling each of said ports, a gear for each valve in one of said series, resilient connecting mechanism between each gear and its corresponding valve, actuating means operatively connecting certain valves of the remaining series of ports with said connecting mechanism, a common operating mechanism arranged to actuate said gears, and governing means for actuating said common operating mechanism, substantially as described.

24. In a compound turbine provided with a plurality of annular series of vanes, an independent series of admission-ports for each of said series of vanes, an independent valve for controlling each of said ports, a rotatably-supported rod secured to each valve of one of said series, a gear connected to each of said rods, actuating means operatively connecting the valves of the remaining series of ports with the rods, a common operating mechanism arranged to actuate said gears, and governing means for actuating said common operating mechanism, substantially as described.

25. In a compound turbine provided with a plurality of annular series of vanes, an independent series of ports for each of said series of vanes, an independent valve for controlling each of said ports, a rotatably-supported rod secured to each valve of one of said series, gears resiliently connected to each of said rods, actuating means operatively connecting the valves to the remaining series of ports with the rods, a common operating mechanism arranged to actuate said gears, and governing means for actuating said common operating mechanism, substantially as described.

26. In a compound turbine provided with a plurality of annular series of vanes, an independent series of ports for each of said series of vanes, an independent valve for controlling each of said ports, a rotatably-supported rod secured to each valve of one of said series, an actuating-gear connected to each of said rods, intermediate gears carried by said rods, gears carried by the valves of the remaining series of ports in mesh with said intermediate gears, a common operating mechanism arranged to engage said actuating-gears, and governing means for actuating said common operating mechanism, substantially as described.

In testimony whereof I affix my signature in presence of two witnesses.

RICHARD H. GOLDSBOROUGH.

Witnesses:
THOMAS DURANT,
G. AYRES.